(12) United States Patent
Melul et al.

(10) Patent No.: US 11,162,249 B2
(45) Date of Patent: Nov. 2, 2021

(54) METHOD FOR ACTIVATING A SERVICE, METHOD FOR ACTIVATING A FIRE HYDRANT, ASSOCIATED DEVICE AND SYSTEM

(71) Applicant: CONSOMIX, Paris (FR)

(72) Inventors: Meyer Patrick Melul, Paris (FR); Dann Melul, Tel-Aviv (IL)

(73) Assignee: CONSOMIX, Paris (FR)

( * ) Notice: Subject to any disclaimer, the term of this patent is extended or adjusted under 35 U.S.C. 154(b) by 0 days.

(21) Appl. No.: 17/279,013

(22) PCT Filed: Sep. 25, 2019

(86) PCT No.: PCT/EP2019/075818
§ 371 (c)(1),
(2) Date: Mar. 23, 2021

(87) PCT Pub. No.: WO2020/064809
PCT Pub. Date: Apr. 2, 2020

(65) Prior Publication Data
US 2021/0310222 A1 Oct. 7, 2021

(30) Foreign Application Priority Data
Sep. 25, 2018 (FR) ...................... 1800992

(51) Int. Cl.
*E03B 9/02* (2006.01)
*A62C 37/50* (2006.01)
(Continued)

(52) U.S. Cl.
CPC ................ *E03B 9/02* (2013.01); *A62C 37/50* (2013.01); *E03B 7/072* (2013.01);
(Continued)

(58) Field of Classification Search
CPC .......... E03B 17/061; E03B 9/03; E03B 7/072; H03M 7/3059; H04W 4/029; A62C 37/50
See application file for complete search history.

(56) References Cited

U.S. PATENT DOCUMENTS 8,614,745 B1 * 12/2013 Al Azemi .............. H04N 7/183
348/159
8,657,021 B1 2/2014 Preta et al.
(Continued)

FOREIGN PATENT DOCUMENTS

| CN | 106600797 A | 4/2017 |
|---|---|---|
| WO | WO 2013/050738 A2 | 4/2013 |
| WO | WO 2017/220911 A1 | 12/2017 |

OTHER PUBLICATIONS

International Preliminary Report on Patentability and the Written Opinion of the International Searching Authority as issued in International Patent Application No PCT/EP2019/075818, dated Jan. 12, 2021.
(Continued)

*Primary Examiner* — Kevin R Barss
(74) *Attorney, Agent, or Firm* — Pillsbury Winthrop Shaw Pittman LLP

(57) ABSTRACT

A method for activating a service associated with an object includes acquiring a position by a geolocation system of a device rigidly attached to the object; calculating an activation code from the acquired position; displaying the activation code; transmitting the activation code by an electronic mobile terminal including a wireless interface to a remote entity; receiving a response code by the electronic mobile terminal, the response code being generated by the remote entity; acquiring the response code by an input interface of the device; decoding the response code by the device;
(Continued)

generating a command for unlocking a service associated with the object rigidly attached to said device.

21 Claims, 4 Drawing Sheets

(51) Int. Cl.
*H04W 4/029* (2018.01)
*H03M 7/30* (2006.01)
*E03B 7/07* (2006.01)
*F03B 17/06* (2006.01)

(52) U.S. Cl.
CPC ......... *H03M 7/3059* (2013.01); *H04W 4/029* (2018.02); *F03B 17/061* (2013.01)

(56) References Cited

U.S. PATENT DOCUMENTS

| | | | | |
|---|---|---|---|---|
| 9,217,242 | B1* | 12/2015 | Jones | E03B 9/04 |
| 10,921,304 | B2* | 2/2021 | Morrow | G01N 33/18 |
| 2007/0120664 | A1* | 5/2007 | Bilbrey | G08B 21/24 |
| | | | | 340/539.32 |
| 2014/0373941 | A1 | 12/2014 | Varman et al. | |

OTHER PUBLICATIONS

International Search Report as issued in International Patent Application No. PCT/EP2019/075818, dated Oct. 17, 2019.

\* cited by examiner

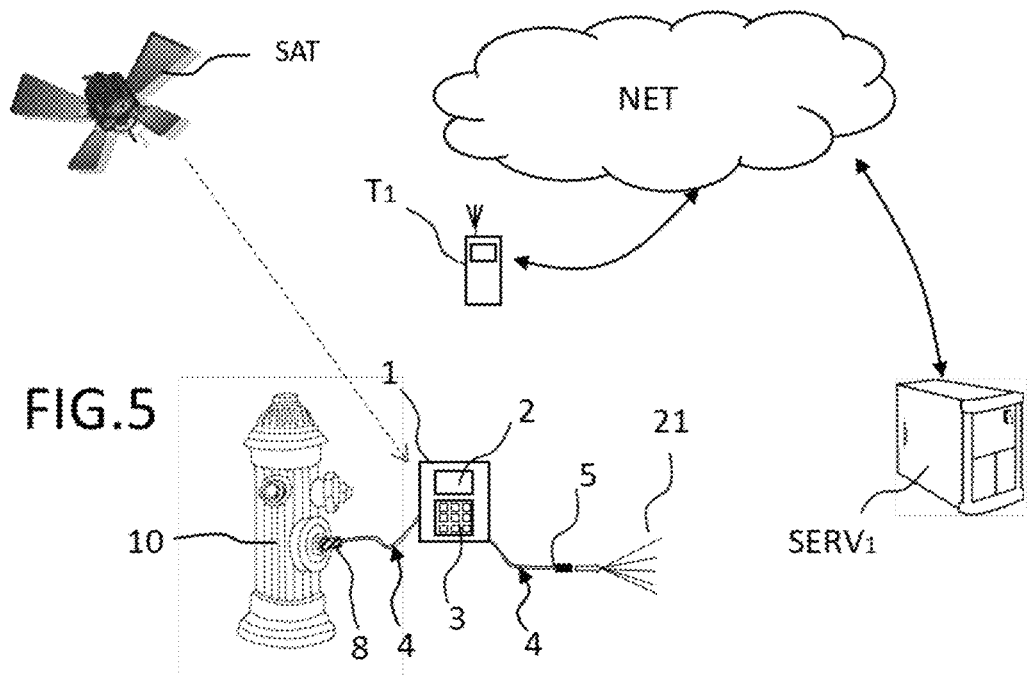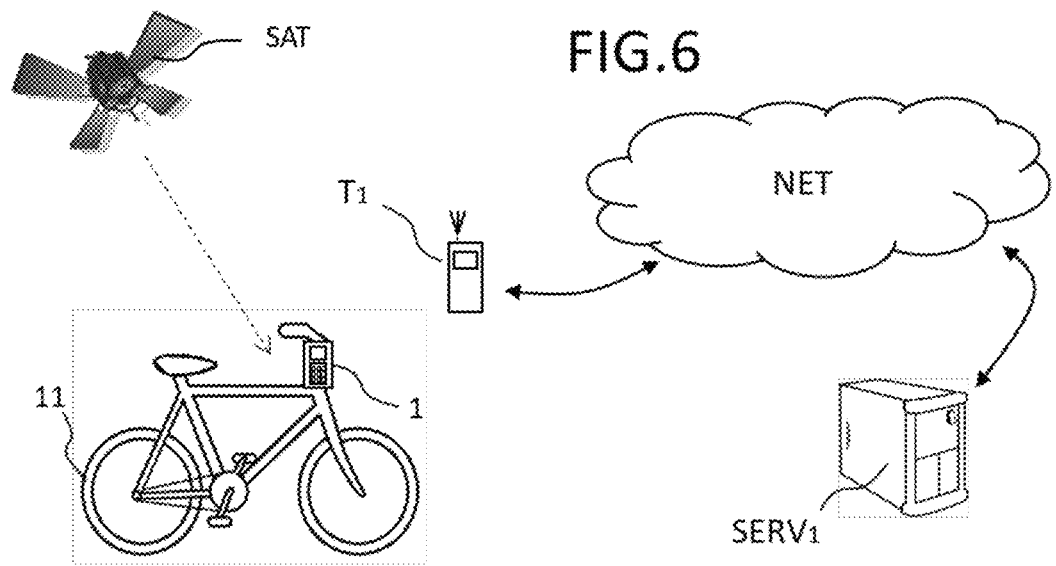

METHOD FOR ACTIVATING A SERVICE, METHOD FOR ACTIVATING A FIRE HYDRANT, ASSOCIATED DEVICE AND SYSTEM

CROSS-REFERENCE TO RELATED APPLICATIONS

This application is the U.S. National Stage of PCT/EP2019/075818, filed Sep. 25, 2019, which in turn claims priority to French patent application number 1800992 filed Sep. 25, 2018. The content of these applications are incorporated herein by reference in their entireties.

FIELD

The field of the invention relates to the field of methods for remotely activating and deactivating equipment in order to authorize or not its use or to access or not a service and/or to monitor the use of said equipment. The field of the invention is also directed to methods validating access by controlling the position of an object. The method of the invention is in particular directed to a device for access to a volume of water delivered by a fire hydrant. Secondly, the invention also applies to a bicycle access device accessible to a community of users.

STATE OF THE ART

Currently, there is a need to use the position as a password or as an element participating in the creation of a password to access a given service. However, the current solutions for accessing a given service are based on electric energy-consuming solutions that do not enable a completely autonomous service to be delivered.

By way of example, the supply of water to temporary users offers limited monitoring possibilities. In Paris, temporary water distribution, for example for work sites, is currently done through a physical device called a "Drawing Kit" or "Kit". Such a kit includes a device for fastening to fire hydrants connected to the city's non-potable and/or potable water system, piping, a visually-readable water meter and a shut-off valve. The drawing kit is therefore used to be connected to any fire hydrant and to draw water. However, the current solution of such a kit has several limitations.

Firstly, it can be connected to any fire hydrant and draw water from the network without any control by the network operator. Furthermore, it can be moved from one fire hydrant to another one without the network operator's permission, thus creating a danger if the firefighters had to urgently connect to a fire hydrant, called "FH", which is supposed to be free, but is actually occupied without authorization.

Another drawback is that a user can keep a Kit between two work sites, thus generating long periods of non-use and consequently, no water consumption can be billed during this period of non-use.

As a result of a defect, the meter fitted to a kit may no longer count water consumption, thus generating a loss of income for the distribution network operator. Only a return to the workshop or the visit of a technician to the user's premises will reveal this.

Reading water consumption is made visually and requires a visit of the operator to the user's premises or a physically return of the kit to the operator. This process has the following drawbacks:

risks of error in reading the meter index;
risks of error in inputting the index in the dedicated billing system;
operator's travel for a low value-added action, that is: reading the index on the water meter,
Difficult travel on work sites in winter or during periods of high heat.

Today, there are solutions aiming at securing access to a service electronically, for example, in order to offset the remote control access. However, these solutions remain unattractive because the implementation of such control implies local management of the energy required to operate components activating or deactivating access to the connecting equipment.

SUMMARY OF THE INVENTION

The invention detailed below makes it possible to overcome the aforesaid drawbacks.

According to a first aspect, the method for activating a service associated with an object comprises:
Acquiring a position by means of a geolocation system of a device rigidly attached to said object;
Calculating an activation code based on the position acquired, the activation code including a number of symbols lower than a predefined number;
Displaying the activation code by means of a display of the device;
Transmitting the activation code by means of an electronic mobile terminal including a wireless interface to a remote entity from a data network;
Receiving a response code by the electronic mobile terminal, said response code being generated by the remote entity;
Acquiring said response code by the device;
Decoding the response code by a calculator and a memory of the device;
Generating a command for unlocking a service associated with the object rigidly attached said device.

One advantage is to secure access to a fire hydrant and to control identification to this fire hydrant especially to manage and allocate water consumption.

According to one example, a payload generated by the terminal and/or recorded in the terminal's memory is transmitted with the activation code to the remote entity. The payload can be a signature, terminal identifier, user identifier or any other type of identifier, date, key, payload from a third party system and in general any other type of data likely to be utilised by a remote entity. The activation code and the payload are integrated for example into a common message and occupy distinct data fields. The message can be encoded and/or encrypted according to a predefined algorithm and implemented by software in the terminal. According to one embodiment, each time the activation code is transmitted, the payload is automatically generated without requiring any action by the user.

According to one embodiment, the method includes a step of truncating the acquired position in order to process a second position resulting from an approximation of the position according to a predefined positioning accuracy.

One advantage is to define a short activation code in order to reduce input errors. Further, a short code enables use of the activation to be facilitated.

According to one embodiment, calculating an activation code generates a unique sequence of digits, said activation code being compressed by lossless coding. One interest is to reduce the number of numbers to enter in a terminal interface especially when a user has to re-input them.

According to one embodiment, the method comprises transmitting a user identifier by means of an electronic mobile terminal including a wireless interface to establish a data link with a remote entity through a data network.

According to one embodiment, the method comprises the following steps performed by the remote entity:
Decoding the activation code by a calculator and a memory of the remote entity;
Comparing the position decoded with a set of positions saved in a memory, each one being associated with an object identifier;
Selecting an object identifier associated with a position located at a distance from the decoded position lower than a predefined threshold and/or verifying that the object identifier selected by means of a terminal interface is associated with a position located at a distance from the decoded position lower than a predefined threshold;
Generating a response code from the object identifier and/or from the activation code.

One advantage is to allow a secure remote control. One advantage is that an unauthorized third party cannot access the device activation without a control of the activation code.

According to one embodiment, the method comprises the following steps performed by the remote entity:
Comparing the user identifier received with a set of identifiers recorded in a memory;
Validating the presence of the user identifier among the set of identifiers;
Validating the step of generating a response code.

According to one embodiment, the remote entity verifies the fire hydrant identifier when it is transmitted. According to another example, the remote server verifies the identification of the device of the invention, for example, when an identifier could be scanned and transmitted to the remote entity by means of the terminal.

According to one embodiment, the method comprises fastening a device to said object. One advantage is to secure the association between the object and the device of the invention in order to reduce the risk of error between geolocation of the device of the invention and identification of the remote object among a database of said objects.

According to one embodiment, the method comprises a plurality of position acquisition operations at regular intervals during a period in which the activation of the service is carried out. One advantage is to secure the use of the device over a given period of use. It allows especially a protection against theft or usurpation.

According to one embodiment, the predefined number is equal to 7. One interest is to reduce the risk of error when inputting the activation code.

According to one embodiment, acquiring at least one response code by the device is carried out by means of an input interface of the device. One advantage is to make an application autonomous that can be used regardless of the device of the invention.

According to one embodiment, the object is a fire hydrant and the device includes an access valve, a screen and an input interface.

According to one embodiment, the unlocking command activates reading of a water meter to measure a delivered flow rate. One advantage is to allow follow-up of the consumption of a fire hydrant use especially to generate an accurate billing of consumption. Another advantage is that it does not cut off access to the water, but only stops reading. This case is to prevent another use of the fire hydrant for example in case of emergency.

According to one embodiment, the unlocking command activates a first solenoid valve to open or close it. One advantage is that the actuated solenoid valve is linked to device 1 and not to the fire hydrant. Thus, a control is carried out without restricting access to the fire hydrant in case of emergency.

According to one embodiment, at least one microturbine is arranged to recover part of the energy from the water flow rate from the fire hydrant. One advantage is to make the device of the invention energy autonomous. It can operate on the basis of an amount of energy that it takes from the water flow.

According to one embodiment, the object is a bicycle and the device includes a lock rigidly attached to the bicycle, a screen and an input interface.

According to another aspect, the invention relates to a fire hydrant access device including:
A fastener to make said access device rigidly attached to said fire hydrant;
A hydraulic unit for conveying a volume of water taken to an outlet of the device;
A water meter for measuring water consumption;
An interface for acquiring a signal delivering a position of said device, said signal being emitted from a location or geolocation system;
A calculator for generating an encoded activation code from the position of the device, said activation code including a sequence of digits with a limited number of symbols;
A display for displaying the activation code;
At least one battery for supplying power to the components of said device;
A user interface for defining a response code to activate or not a service associated with the fire hydrant.

According to one embodiment, the fire hydrant access device includes at least one first solenoid valve to activate its closing or opening according to the value of a command received.

According to another aspect, the invention relates to a bicycle access device including:
A fastener for making said access device rigidly attached to a bicycle;
A lock actuated by a command from the device in order to block the bicycle's riding function;
An interface for acquiring a signal delivering a position of said device, said signal being emitted from a location or geolocation system;
A calculator for generating an activation code encoded from the position of the device, said activation code including a sequence of numbers with a limited number of symbols;
A display for displaying the activation code;
At least one battery for supplying power to the components of said device, said battery being powered by a system that recovers kinetic energy of the bicycle;
A user interface for defining a response code to activate or not a service associated with the bicycle.

According to another aspect, the invention relates to a method for deactivating a service associated with an object comprising:
Initiating an action to generate a deactivation code;
Displaying the deactivation code by means of a display of the device;

Transmitting a deactivation code including the volume of water consumed by means of an electronic mobile terminal, said terminal including a wireless interface for connection to a data network;

Receiving a second response code by the electronic mobile terminal, said second response code being generated by the remote entity;

Acquiring said second response code;

Decoding the response code by a calculator and a memory of the device;

Generating a locking command for a service associated with the object rigidly attached to said device.

According to one example, a payload generated by the terminal and/or recorded in the terminal memory is transmitted with the deactivation code to the remote entity. The payload can be a signature, terminal identifier, user identifier or any other type of identifier, date, key, payload from a third party system and in general any other type of data likely to be transmitted to be used by a remote entity. The deactivation code and the payload are integrated, for example, into a common message and occupy separate data fields. The message can be encoded and/or encrypted according to a predefined algorithm and implemented by software in the terminal. According to one embodiment, each time the deactivation code is transmitted, the payload is automatically generated without requiring any user action.

BRIEF DESCRIPTION OF THE FIGURES

Further characteristics and advantages of the invention will become apparent from the following detailed description, with reference to the appended figures, which illustrate:

FIG. 5: one embodiment of a system of the invention in which the device is a device for access to a fire hydrant;

FIG. 6: one embodiment of a system of the invention in which the device is a device for access to a self-service bicycle.

DESCRIPTION

In the description that follows, a fire hydrant refers to a water intake or water point that is accessible in an open space such as a public space. This may be at a sidewalk, garden, square, roadway, harbor, or any other place accessible to an individual. The fire hydrant can be referred to in the literature by various terms such as a water intake or fire hydrant, post hydrant, pillar hydrant, or fire plug.

The present description especially details one exemplary embodiment of a device of the invention, such as a device adapted to cooperate with a fire hydrant 10. Furthermore, one exemplary embodiment of activating a service of an object is detailed, especially when the object is a fire hydrant 10 considering the following services: access to water and consumption meter.

According to another example, device 1 of the invention is a bicycle access device and the object is a bicycle 11.

The invention therefore covers a device 1 that can be configured and arranged in different ways depending on the object 10, 11 under consideration. The method of the invention also includes different modes of implementation which are detailed below.

Figure 1:
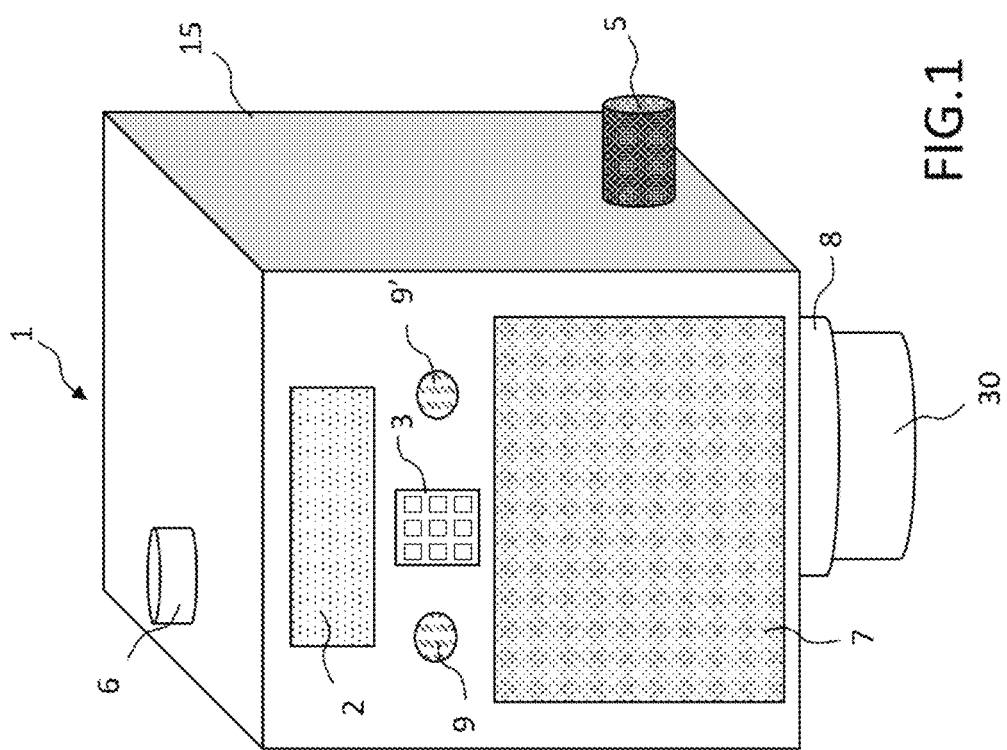
FIG. 1: one embodiment of a device of the invention.

FIG. 1 represents one exemplary embodiment of a device 1 of the invention. According to one embodiment, device 1 is adapted to be connected to a fire hydrant 10. It comprises a fastener 8 enabling said device 1 to be held in contact with a water outlet 30 of a fire hydrant 10. For this purpose, the fastener 8 may be of cylindrical shape and include a thread or holding guide for securing the fastener to water outlet 30 of fire hydrant 10. Fastener 8 extends up to a hydraulic unit 4 that enables a volume of water taken under pressure to be conveyed to an outlet 5.

The exemplary case of device 1 of the invention represented in FIG. 1, is in particular adapted to a vertical water outlet leading to the ground. Depending on the type of fire hydrant 10 concerned, fastener 8 can be adapted and arranged according to other configurations. According to another embodiment, an adapter device (not represented) can be combined with device 1 to convey water taken from a given fire hydrant outlet to inlet 8 of device 1.

According to one exemplary embodiment, device 1 includes a frame 15 for protecting various components, especially hydraulic and electronic components.

Electronic Components

According to one embodiment, device 1 includes a screen 2 for displaying a status of a command, activation code, response code or any other information to be communicated to a user.

In the example represented in FIG. 1, a numeric keypad 3 allows a user to input a response code $CR_1$, $CR_2$ sent by a remote server and received by a mobile terminal $T_1$. Any other information to be communicated to device 1 can be transmitted via the user-accessible keypad.

According to one embodiment, the keypad 3 includes a numeric pad which can be touch-sensitive, haptic or even comprise mechanical keys of the push-button type. According to one exemplary embodiment, an ON/OFF button or switch 9 is accessible to a user and an activation button 9' to obtain a GPS position is also accessible. According to one embodiment, the button 9' is inaccessible to the user without a means of access inside the frame 15. In the latter case, the button 9, can be, for example, inside the frame 15. In the latter case, switching on is carried out prior to activation, when device 1 is handed over to the user or when device 1 is turned on. According to one embodiment, buttons 9 and 9' can be gathered in a single button/switch. In the latter case, when device 1 is switched on, retrieving the GPS position is performed automatically by device 1.

According to one embodiment, device 1 of the invention includes an antenna 6 to receive at least one geolocation signal. According to one example, the antenna can be integrated into the GPS chip. This signal can come from one or more satellites SAT, from a GSM, 3G or 4G cell, or from a wireless data network, such as the WIFI network for retrieving positioning information. For this purpose, device 1 includes means for retrieving a position and processing this position to record it in a memory in a predefined format.

Device 1 includes electronic components for processing geolocation data in order to perform operations on said data. Among the components, a at least calculator and a memory are required in order to perform minimal processing operations on the data. According to different embodiments of the invention, electronic boards including microprocessors, microcontrollers, FPGAs, and any other electronic component can be implemented in different embodiments of the invention.

According to one example, device 1 of the invention includes a software layer that can be executed on an electronic medium, such as an electronic board. The software layer may be, for example, a computer program or a set of software functions configured to operate together in order to process data generated or received by device 1 of the invention.

Functions processed by the software layer are described with respect to the different implementations of the activation and deactivation method of the invention.

Hydraulic Unit

In the example case in FIG. 1, device 1 further includes a hydraulic unit 4 allowing a volume of water taken from a fire hydrant 10 to be conveyed to an outlet 5 to which it is desired to direct the outgoing water flow 21.

The hydraulic unit 4 includes various hydraulic elements such as pipes, valves, connections, possibly dividers, pressure balancing elements, elements for controlling or orienting flow of the liquid distributed.

Figure 2:
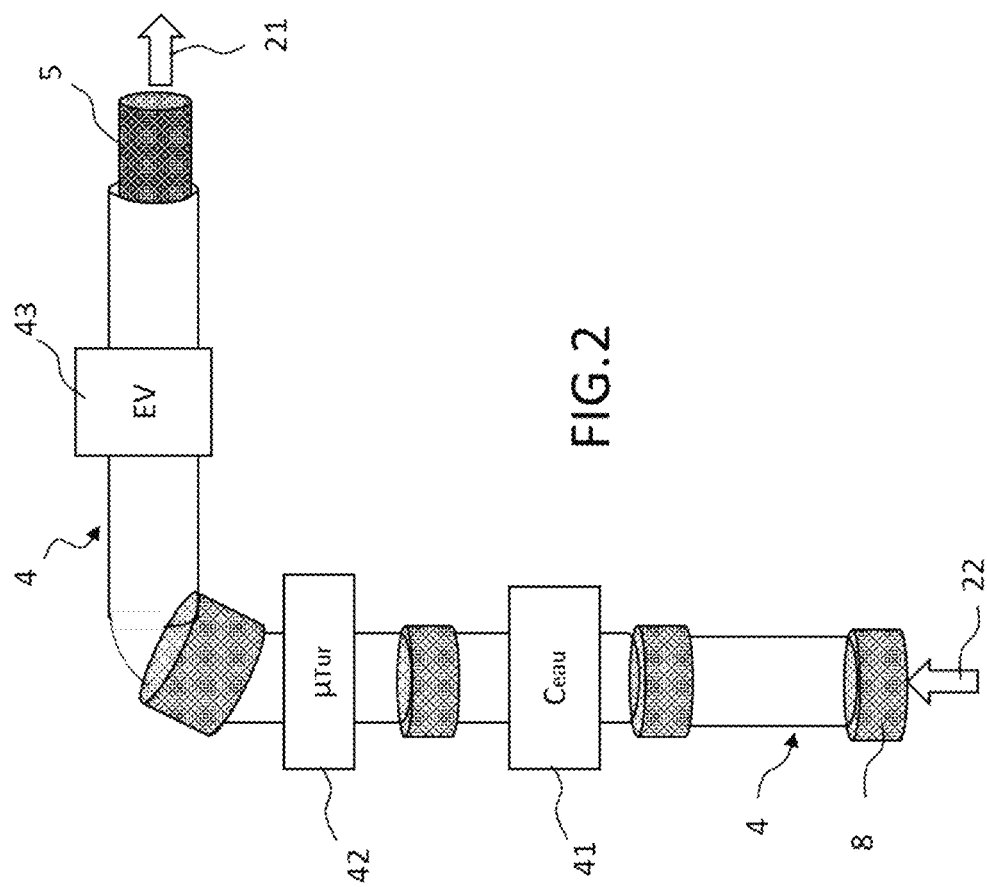
FIG. 2: one exemplary embodiment of a hydraulic unit of a device of the invention.

According to one exemplary embodiment, the hydraulic unit 4 includes a water meter 41 noted $C_{water}$. The water meter 41 is used to measure or evaluate water consumption of a facility. Such a water meter 41 is represented in FIG. 2. According to different embodiments, the water meter 41 is a speedometer or turbine meter, a volumetric meter or a calorimeter. The water meter 41 can be a flow meter.

Such a water meter 41 can be arranged at the inlet 8 of hydraulic unit 4 or at the outlet 5 of hydraulic unit 4. In order to make a proper evaluation of water consumption, the water meter $C_{water}$ is advantageously placed as close as possible to the inlet 8 of the hydraulic unit 4.

According to one embodiment, the hydraulic unit 4 includes an energy recovery device such as a set of microturbines $\mu_{Tur}$. The microturbines $\mu_{Tur}$ are arranged so as to recover kinetic energy produced by the incoming water flow in hydraulic unit 4. The microturbines 42 then convert kinetic energy into electric energy. The electric energy is then stored in at least one battery present in the device 1. The battery is then charged each time it is used. According to one embodiment, the battery can be integrated into a general power supply including a booster battery which is periodically charged to compensate for a complete discharge of the battery charged by the microturbines 42. This may be the case when a device 1 has not been used for a long period of time. According to one embodiment, the battery and the booster battery are the same battery.

According to one embodiment, the battery is arranged in an enclosure of device 1. The battery (not represented) can then distribute power to different components of device 1 such as the geolocation system, the screen, the electronic components for processing the data acquired from the different sensors: position, consumption, etc.

In addition, the battery enables mechanical elements such as solenoid valves or opening/closing valves to be activated or not.

According to one embodiment, the hydraulic unit 4 includes at least one solenoid valve 43 noted EV. The solenoid valve 43 is for driving closing and opening of the water distribution through device 1. Device 1 then behaves as a device for activating or deactivating the water distribution access service. The solenoid valve 43 can be driven by a discrete or digital control. By "discrete", it is meant an electrical connection dedicated to this driving command. It is, for example, a physical electrical branch. According to one embodiment, solenoid valve 43 is configured to let a certain volume of water pass therethrough. In this latter embodiment, the water flow rate delivered 21 can be associated with a service according to a response code received by device 1. This solution makes it possible to limit the flow rate allocated to a given use.

According to one embodiment, the hydraulic unit 4 includes a through outlet 5 that can be rigidly attached to the frame 15. For this purpose, fastening can be made by means of a connector including a clamping element in order to hold a pipe fastened to the outlet of device 1 at the outlet 5. Possibly, a mechanical safety valve may be added and fastened to device 1 of the invention at the outlet 5.

Figure 3:
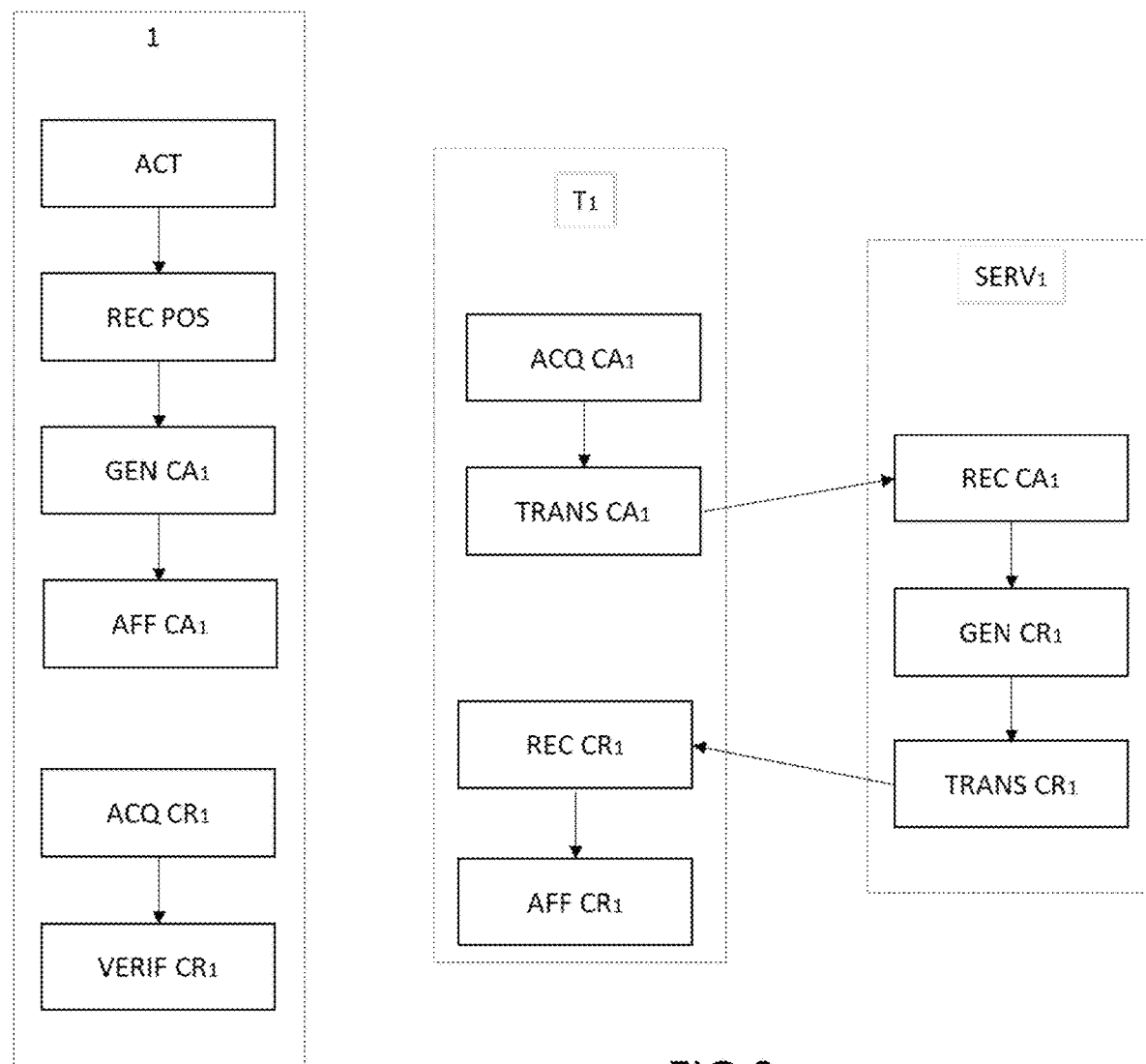
FIG. 3: the steps of one embodiment of the activation method of the invention.
Figure 4:
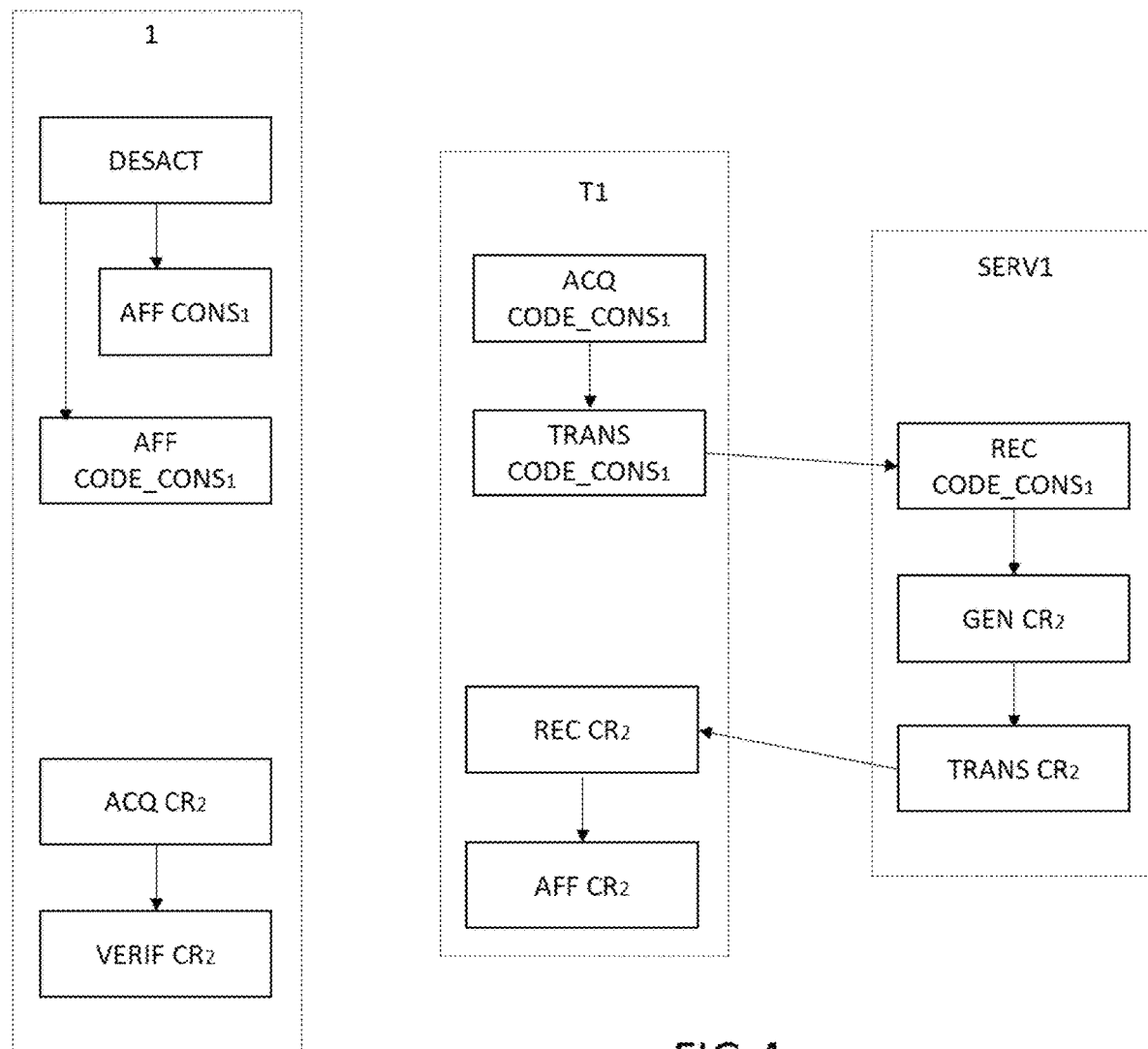
FIG. 4: the steps of one embodiment of the deactivation method of the invention.

FIG. 3 represents one embodiment of the activation method of the invention. FIG. 4 represents one embodiment of the deactivation method of the invention.

Activation Method—Case of the Fire Hydrant

The method of the invention includes a first step of activating ACT the device 1. Prior to this, switching on the device can be carried out. Switching on can be carried out directly on a front face of device 1 when a switch on button 9 is present. According to one alternative embodiment, switching on can be carried out remotely, for example from an instruction transmitted by a wired or wireless link. By way of example, device 1 can be switched on when approaching a terminal $T_1$, e.g. a smartphone, by emitting a Bluetooth wake-up signal for activating start of device 1.

Activation ACT results in acquiring a GPS signal in order to determine the position of device 1. For this purpose, device 1 activates a GPS receiver to receive a GPS signal. The receiver is then configured to receive and record the position received from a geolocation or positioning system. The receiver advantageously includes a GPS signal acquisition chip.

According to other alternatives, the signal is a signal from a geolocation system other than the GPS system, such as the GALILEO system. According to another alternative, the position of device 1 is deduced from signals of a WIFI, GSM, 3G, 4G, LTE protocol. In the latter case, the position can be deduced from a triangulation or trilateration method. The method includes a step REC_POS of receiving the position of device 1.

Device 1 includes a calculator to derive coordinates of the position received from device 1 such as latitude LAT and longitude LON. The calculator can be pre-configured to select only part of the coordinates with a desired and pre-defined accuracy. By way of example, for an accuracy of about 10 meters, 6-digit coordinates for latitude and longitude are sufficient to locate device 1. In this case, the 6 digits form a decimal number. Depending on the desired precision, a truncation of the coordinates can be performed especially when the received position includes more than a given number of digits.

The position of device 1 is stored in a memory and/or directly processed to generate an activation code $CA_1$. The method includes a step GEN_$CA_1$ for generating an activation code $CA_1$. One advantage is that a code is generated that includes a unique sequence of symbols. Additionally, another advantage is to emit a code that is shorter than the GPS coordinates actually received by device 1 so that a user can manually send this code back to a remote entity through an interface on a terminal distinct from device 1.

According to one example, symbols generated are numbers and letters. According to another example, the activation code $CA_1$ includes only digits.

In order to generate the activation code $CA_1$, the N digits of the latitude LAT and the P digits of the longitude LON can be put end to end without a decimal to obtain a unique sequence of digits.

In this example, latitude LAT=47.9444 and longitude LON=02.4888 and the activation code is 479444024888. This is a sequence of 12 digits that are generated to be displayed on a display AFF in a step AFF_$CA_1$ of the method. One advantage in this case is that an activation code $CA_1$ can be input in a single operation on the terminal $T_1$. The user copies the sequence displayed on the screen of device 1.

According to another example, the activation code $CA_1$ may result from digital compression to reduce the code to be displayed in order to simplify the operation for the user. According to one embodiment, the compression is carried out lossless, that is the generated activation code $CA_1$ can be processed in order to reconstruct the two GPS coordinates acquired.

According to one embodiment, the maximum predefined number $N_{max}$ of number coding the activation code $CA_1$ depends on the one hand on the desired accuracy of the position which is processed from the position received by the antenna and on the other hand on the compression desired to be implemented to reduce the size of the activation code $CA_1$.

Different digital compression operations can be carried out either alternatively or in combination. The generation of intermediate number(s), resolution into prime numbers or the use of algebraic operators can be implemented in order to compress a given number with a predetermined compression ratio.

In addition, compression can be achieved by toggling the coordinates into another coordinate system or by restricting the coordinate numbers according to a priori knowledge of a predefined geographic region. By way of example, for an implementation of the method of the invention in France, the integral part of coordinates can be ranged as follows:

42<LAT<51,
−4<LON<8.

The latitude can therefore be coded with a single digit from 0 to 9 and the longitude LON can be coded with 2 digits from 0 to 12. It is therefore possible to reduce the size of the activation code by considering spaces in which the coordinates can be encoded with a minimum number of digits.

The method of the invention thus makes it possible to generate a limited number of digits corresponding to the coordinates of a received position for a given accuracy. The method makes it possible to code and compress these coordinates into a limited sequence of symbols to be displayed on a display of device 1.

According to one exemplary embodiment, the display 2 is integrated into a front face of the device 1 so as to be directly visible by a user who would have previously activated the device 1. The display 2 can be, for example, a digital display of OLED, LED, LCD or plasma technology.

The activation code $CA_1$ is therefore displayed on display 2. The activation code $CA_1$ can be displayed until a signal is received or a command is activated on the device 1. According to another example, the activation code $CA_1$ is displayed for a predefined period of time in order to limit power consumption of device 1.

The method includes a step ACQ_$CA_1$ of acquiring the activation code $CA_1$ by a mobile terminal $T_1$. A user of device 1 is then able to input the activation code $CA_1$ generated from a keyboard of a terminal $T_1$. Terminal T1 can be a smartphone, tablet or any other electronic device that can transmit signals to a remote antenna. According to one embodiment, the terminal is a touch terminal. Terminal T1 includes software to generate an input interface. The input interface can then comprise various information fields such as a user identifier, an identifier of terminal $T_1$, an identifier of device 1, a URL of a website from which a user can authenticate and proceed with activation or deactivation, the time, the battery level, etc. The input interface enables the sequence of digits of the activation code to be input, for example from a numeric keypad.

According to another embodiment, part of the information is obtained by the terminal $T_1$ by reading a code written on device 1. The code can be, for example, a bar code or a QR code or flash code. In this case, the user scans the apparent code on device 1, for example, from an optic on terminal T1, such as the lens of the camera or video camera. The code is then decoded by calculation means of the terminal $T_1$ and the data is recorded in a memory of the terminal $T_1$. The data can then be processed for possible transmission to the remote entity. The scanned code can also be automatically integrated into the input interface when the interface offers code acquisition at the time of inputting data.

According to another embodiment, the activation code is automatically transmitted to the terminal by a wireless interface for example of the Bluetooth type.

The method includes a step TRANS_$CA_1$ of transmitting the activation code $CA_1$ to a remote entity $SERV_1$. When the activation code $CA_1$ is input, a command for activating its transfer to a remote entity $SERV_1$ is initiated by the user. According to one embodiment, a confirmation message or a second validation can be implemented by the method of the invention in order to reduce the errors made.

Transmitting the activation code $CA_1$ can, for example, be carried out by data coding and modulation of a radio signal to a GSM, 3G, 4G beacon.

According to one embodiment, the terminal $T_1$ transmits a set of data to the remote entity SERV1 such as:
- a user identifier and/or;
- an identifier of terminal T1 and/or;
- user profile data and/or;
- an identifier of device 1 and/or;
- an identifier of the object such as the fire hydrant 10 and/or;
- data relating to a previous consumption stored on the terminal $T_1$ and/or;
- etc.

The identifier of fire hydrant 10 can be, for example, selected from a list of fire hydrants extracted from a database of a remote server, which may be the same server as $SERV_1$ or another server. According to one exemplary embodiment, the user can define an address in an input interface of terminal T1 in order to preselect a set of fire hydrants likely to correspond to the address indicated. Selecting the fire hydrant to which device 1 is connected can then be made from a short list of choices.

The method of the invention includes a step REC_$CA_1$ of receiving the activation code $CA_1$ by a remote entity $SERV_1$. The remote entity $SERV_1$ is, for example, a server which includes calculation means and at least one memory to store data. The remote entity includes a communication interface to be accessible from a data network such as the Internet network. In this context, the terminal T1 and the server SERV1 can communicate together by means of a bidirectional data link.

The method includes a step of decoding the activation code CA1 received by the remote entity SERV1. By virtue of lossless coding, the server SERV1 is configured to decode the activation code CA1 and determine the coordinates of the position of device 1. The server SERV1 includes a memory or interface to a remote memory including a set of positions of fire hydrants 10. A comparison of the position decoded from the activation code CA1 with the closest recorded position of fire hydrants 10 will determine to which fire hydrant 10 the user is trying to connect to in order to take a volume of water. Therefore, server SERV1 includes a step of verifying that the received activation code CA1 corresponds to a position of a fire hydrant it knows. According to another embodiment, server SERV1 verifies that the received activation code CA1 corresponds to a position of a fire hydrant 10 that is referenced in a database accessible to said server SERV1. Further, according to one embodiment, it checks that this fire hydrant is actually the fire hydrant 10 indicated, if necessary, by the user by means of terminal T1.

Because of the transmission of its geographic coordinates, the device 1 of the invention also offers the possibility of prohibiting it, remotely by means of the server SERV1, from drawing water from a fire hydrant 10 to which the connection would not be authorized.

According to one embodiment, the server receives requests beforehand to use device 1 and/or a schedule of access to fire hydrants 10. In this case, the server SERV1 is able to make a comparison between the activation requests received and the previously configured access requests.

The method includes a step of generating GEN_$CR_1$ a response code $CR_1$ when conditions are met. The response code $CR_1$ is also noted first response code $CR_1$ in order to distinguish its notation with a response code sent during deactivation which corresponds to a second response code $CR_2$. According to one embodiment, the remote entity SERV1 decodes for example a user identifier. For this purpose, the server SERV1 can access a database of referenced users. If the activation code $CA_1$ is verified and the user identifier corresponds to an identifier known to the data management system, the server SERV1 generates a response code $CR_1$. The response code $CR_1$ is, for example, a pre-recorded code associated with fire hydrant 10, or a code generated from the activation code $CA_1$. In the latter case, the activation code CA1 can be obtained from a "challenge-response" type of authentication, known to those skilled in the art, whose response is generated depending on the challenge.

The method includes a step TRANS_$CR_1$ of transmitting the response code $CR_1$ to terminal T1. The response code $CR_1$ is then sent automatically after verification from the server SERV1 to terminal T1 from the data network NET. The method includes a step REC_$CR_1$ of receiving the response code $CR_1$ by terminal T1. The response code $CR_1$ is then displayed by an interface of terminal T1. During data transmissions between the server SERV1 and terminal T1, the invention can be implemented with different data transmission protocols and different data encoding techniques.

The method includes a step ACQ_$CR_1$ of acquiring the code $CR_1$ by device 1. When a user accesses the response code $CR_1$ from his/her terminal $T_1$, he/she is then able to input this response code $CR_1$ by virtue of a user interface of device 1. For example, the user interface includes a keypad 3 that enables a sequence of symbols, such as numbers, to be input. Screen 2 displays the input code so that the user can verify no mistake is made while inputting the code. When the response code $CR_1$ is input, the user validates the action by pressing a button or actuator. In this case, the input code is recorded.

The method includes a step VERIF_$CR_1$ of verifying the input code. According to one example, device 1 decodes and verifies the input response code $CR_1$ with a code that is associated with device 1 and/or obtained from the activation code $CA_1$ and recorded in a memory of device 1. When the input code is verified, device 1 is able to unlock a solenoid valve 43 and/or activate the water meter 41.

The method of the invention thus makes it possible to secure access to a fire hydrant 10 by checking a user identifier and checking the position of the latter. If the user is not in a correctly identified place or if he/she has a device 1 which is not the device allocated to the latter place, the water access service can be checked and controlled remotely via device 1. Indeed, device 1 is able to authorize or not access to the water depending on whether or not a code and its value are received upon receipt.

Finally, controlling water consumption by means of device 1 and allocating this consumption to a given user can be automatically managed by a remote entity.

Deactivation Procedure—Case of Fire Hydrant

The invention also relates to a method for deactivating a given service, such as access to a fire hydrant 10. FIG. 4 represents one embodiment for implementing the steps of the deactivation method of the invention.

According to one example, the deactivation DESACT is initiated by an action on device 1. When deactivation is initiated, a confirmation request can, for example, be set up to warn about any unfortunate action by the user who does not wish to deactivate the service. Deactivation can be generated from a touch control or by an action on an actuator such as the activation and deactivation button.

Upon detecting a deactivation, device 1 displays the water consumption $CONS_1$. According to one embodiment, this is the water consumption since the last activation on display 2. According to another activation mode, it is the water consumption since device 1 was turned on or reset. Thus, after using device 1, a consumption expressed in liters is transmitted from a memory in the water meter to display 2. The consumption $CONS_1$ is then displayed, this step is noted AFF_$CONS_1$ in FIG. 4. In addition or alternatively, a deactivation code or a consumption code CODE_$CONS_1$ is displayed on display 2, this step is noted AFF_CODE_$CONS_1$. The consumption code CODE_$CONS_1$ is generated from the consumption $CONS_1$ in order to encode said consumption $CONS_1$ and transmit it to the remote entity $SERV_1$. According to one example, the consumption code CODE_$CONS_1$ can be generated from a secret shared between the remote entity $SERV_1$ and device 1. According to another alternative, the consumption code CODE_$CONS_1$ is generated from the consumption $CONS_1$ and the position of device 1. According to another alternative, the consumption code CODE_$CONS_1$ is identical to said consumption $CONS_1$.

The consumption $CONS_1$ or the consumption code CODE_$CONS_1$, which will be noted consumption $CONS_1$ later, is acquired by terminal T1. The acquisition step is noted ACQ_$CONS_1$. According to one exemplary embodiment, the user inputs the consumption code $CONS_1$ by means of the interface of terminal T1. Terminal T1 records the consumption $CONS_1$ in a memory and transmits this consumption to the remote entity $SERV_1$ via the data network NET. The transmission step is noted TRANS_$CONS_1$ in FIG. 4.

The deactivation method then includes a step REC_$CONS_1$ of receiving consumption $CONS_1$ by the server SERV1. According to one example, this is the same server as the activation method server. According to another example, the server SERV1 can be another data server connected to the data network NET.

The consumption $CONS_1$ is then stored in a memory of the server SERV1. The consumption $CONS_1$ can then be utilised, for example, to be assigned to a user ID, especially to generate a billing or follow-up on the water consumption of the user in question.

In order to correctly deactivate device 1 of the invention, the method of the invention includes, according to one embodiment, a step GEN_CR$_2$ of generating a response code CR$_2$ carried out by the server SERV1 in order to acknowledge the procedure for deactivating the server to device 1.

When the deactivation is initiated on device 1, for example through the button 9', the water meter reading is deactivated. According to one embodiment, locking the solenoid valve EV is activated when the deactivation is initiated on device 1. According to another embodiment, these actions are carried out when the solenoid valve is switched off directly on device 1.

The receipt of a response code CR$_2$ by device 1 confirms this deactivation at device 1. The response code CR$_2$ is sent by the server SERV1 to the terminal. This response code CR$_2$ can be appended to other data, such as time stamp data or user ID data.

The method includes a step REC_CR$_2$ of receiving a second response code CR2 by terminal T1. The second response code CR2 is recorded and displayed on the display of terminal T1. The user can then look up the second response code CR2 received. According to one example, the second response code CR2 comprises between 4 and 6 digits. According to another embodiment, it includes a shorter or longer sequence. It can furthermore comprise symbols other than numbers.

According to one example, the response code CR2 is automatically generated from the data of the deactivation code CODE_CONS$_1$.

The method includes a step ACQ_CR$_2$ of receiving the response code CR2 through, for example, its interface. For example, the user can input the response code CR2 using the keyboard. He/she can furthermore control input from the screen that displays the numbers input.

Device 1 then includes a step VERIF_CR$_2$ of verifying the response code CR2 and initiating a deactivation or confirming a deactivation. According to one embodiment, the effective deactivation of device 1 causes solenoid valve 43 to close so that access to the water is cut off.

According to one embodiment, all the actions performed by elements of device 1 are referenced in a logbook. The actions correspond to software events that can, for example, be dated. In addition, various data can be associated with each event in the logbook. Among this data, the position of device 1 can be recorded when the event occurred or the activation identifier to determine to which activation the recorded event refers. An activation identifier can correspond to an assigned number, for example, the numbers being assigned sequentially in ascending order.

In this way, during an activation and deactivation cycle of device 1, the remote entity SERV$_1$ that can be located in a control center is able to determine:
  the location of device 1 when it was in use; and,
  the amount of water consumed from device 1.

Since the activation and deactivation methods are performed by means of a terminal T$_1$ external to device 1, the energy impact of the steps performed by terminal T1 on the energy consumption of device 1 is limited.

Service Access System

According to another aspect, the invention relates to a system, as represented in FIG. 5, including a Device 1, a terminal T$_1$ and a remote entity SERV1. The remote entity SERV1 is capable of receiving an activation code CA1 and of transmitting a response code CR$_1$ or of receiving. In addition, the remote entity SERV1 is capable of receiving a consumption CONS$_1$ or a consumption code CODE_CONS$_1$ and of transmitting a second response code CR$_2$.

Device 1 is physically connected to a fire hydrant 10 by means for securing the two elements. Device 1 includes a GPS receiver to receive a position from a plurality of satellites SAT or a wireless link interface to receive a positioning signal. According to one embodiment, there is no physical or wireless link between device 1 and fire hydrant 10. Terminal T1 is connected to a data network and includes electronic and software components to implement an interface for managing activation of a fire hydrant 10. The server SERV1 is also connected to the data network. According to one embodiment, an additional server for managing access rights is implemented to authorize a given user to exchange data with the server SERV1.

According to one exemplary use of the system, device 1 can be used by a municipality, a city or any operator operating a water distribution system for events requiring temporary access to this system. According to different implementations, device 1 can be used for work site connections or other fairground connections. During works, the device can be connected to a fire hydrant in order to supply water to the work site. When device 1 is activated, a control center verifies that it is connected to the fire hydrant provided to that work site, thus confirming that device 1 has not been connected, intentionally or by mistake, to an access to that was not reserved for it.

Upon completion of the works, Device 1 may be deactivated. At that time, the system operator may be informed of the water consumption measured by device 1. The operator will then know that the fire hydrant originally assigned to the work site may be assigned to another user.

Device 1 may be used in such a way that activation or deactivation either triggers opening of one or more solenoid valves allowing water to be drawn or triggers closing of such solenoid valve(s), preventing water from being drawn.

Device 1 of the invention can also be used without the activation and deactivation actuating a solenoid valve. It then allows the follow-up and control, a posteriori, of consumptions and geographic positions relating to each use of device 1.

According to one embodiment, scanning a QR code present on device 1 can be performed from terminal T$_1$. Reading the QR code can for example allow a WEB page to be loaded from a remote server to which the user can authenticate himself/herself. According to one example, the identifier of device 1 is then generated in an input field of the WEB interface to which terminal T1 is connected.

According to one example, the user inputs his/her identifier and password in the interface. The user can then, for example, select a Fire hydrant 10 from a proposed list. The proposed list can be retrieved based on a remote database that includes a set of fire hydrants 10. In one example, a subset of fire hydrants 10 is selected based on a user-defined geographic zone or based on user rights. According to one embodiment, checking the user identifier is carried out beforehand to verify the rights he/she has, especially to select a subset of fire hydrants 10 to which he/she has access. According to one exemplary embodiment, checking is not directly carried out with the user identifier but with a contract number which is associated with the user identifier.

According to one example, the user selects the identifier of device 1 that he/she wants to activate from a list, for example when several devices 1 have been made available to him/her. In this alternative embodiment of an activation sequence, the user then inputs the activation code in a terminal interface after these preliminary steps and transmits it to a remote entity.

In this latter alternative, the remote entity $SERV_1$ compares the position included in the activation code $CA_1$ by decoding said code with the position of fire hydrant 10 previously selected by the user. When the positions are identical, within a margin of error, the response code $CR_1$ is returned by the server SERV1.

Possibly, during the use of device 1, at regular intervals or after a prolonged period of non-drawing water, device 1 performs a new acquisition of its position and verifies that it has not changed significantly. If it has changed, according to one embodiment, device 1 blocks the solenoid valve EV.

According to one embodiment, one or several operations of acquiring coordinates, for example GPS coordinates, can be contemplated in order to make the calculated position of device 1 more reliable. According to an exemplary embodiment, four position acquisition operations are carried out successively, the calculator is then configured to delete two extreme positions of the sample and keep the two non-extreme positions. The retained positions is are then averaged in order to secure the position calculation.

According to one exemplary embodiment, terminal T1 is integrated into device 1. In this case, it corresponds to a component of device 1. In this case, the identifier and the position $POS_1$ of device 1 can be automatically sent to the remote entity $SERV_1$.

In this configuration, the remote server $SERV_1$ verifies that on the list of fire hydrants 10, there is at least one fire hydrant near the position $POS_1$. If this is the case, it authorizes unlocking of device 1.

Device 1 receives authorization from the remote server by a response code and opens the solenoid valve EV.

Possibly, at regular or random intervals or after an absence of consumption exceeding a predefined time, device 1 of the invention can perform an identical verification, for example of the position of device 1.

If the new POSi position is significantly different from $POS_1$, it can deactivate the solenoid valve EV or turn to the remote entity $SERV_1$ for a new authorization request.

At each connection to the remote server $SERV_1$, device 1 can communicate the number of liters spent, that is a data relating to the measured consumption.

Upon deactivation, device 1 closes the solenoid valve EV and optionally communicates its position. It also advantageously communicates the consumption.

Activation Method—Case of the Bicycle According to another embodiment, device 1 of the invention is a device 1 fastened to a bicycle. Bicycles are self-service bicycles that can be rent or reserved from a mobile application installed on a smartphone or tablet or via a web portal accessible especially from a smartphone or tablet. FIG. 6 represents the system of the invention when such a device 1 is fastened to a bicycle 11. When a bicycle fleet includes several tens, hundreds or thousands of bicycles, each of them is equipped with a device 1 of the invention. Device 1 is possibly functionally linked to a lock that can be activated depending on the activation or deactivation of device 1. According to one embodiment, device 1 includes a mechanical interface enabling a lock to be activated. According to another example, device 1 remotely activates the lock via an electronic component, a wireless interface and a digital instruction transmitted.

Device 1 can be arranged at the handlebars, saddle or closest to the wheel of a bicycle.

A user wishes to activate the service, in other words use the bicycle that is locked. To do so, he/she generates an action on device 1, for example by depressing an actuator on the device. When the activation is initiated, the GPS receiver or more generally the position receiver acquires the position. According to another embodiment, the latest acquired position of the bicycle is used. According to another embodiment, upon receiving the position from device 1, the acquired position is compared with the latest received and stored position.

Device 1 includes a calculator for generating an activation code $CA_1$ as detailed above for the case of fire hydrant 10. Device 1 includes a screen for displaying the activation code $CA_1$. The activation code CA1 is then transmitted to a remote entity SERV1 by means of a terminal $T_1$. According to one embodiment, a bar code or QR code fastened to the bicycle may facilitate input of part of the parameters, for example, the bicycle identifier, which will then be transmitted to the remote entity SERV1. According to one exemplary embodiment, the user inputs the activation code on an interface of terminal T1 to transmit it to a remote entity. According to another embodiment, the activation code CA1 can be automatically transmitted by virtue of a wireless interface of device 1 communicating with terminal T1. The wireless interface can be implemented with a protocol such as Bluetooth. The activation code $CA_1$ is then automatically received by terminal T1 to be retransmitted to the server SERV1. However, such a link is not necessarily desired when it is desired to limit access to device 1 in order to avoid hacking, for example, or when the consumption of device 1 is critical and a limitation of services requiring electric power is sought.

Similarly, the server SERV1 issues a response code $CR_1$ when the activation code meets at least one condition, such as the presumed locality of the bicycle 11. The server SERV1 can also check the identity of the service user. This identity can be checked by comparing the user identifier transmitted with the activation code $CA_1$ by terminal T1 with a user database. A response code $CR_1$ is generated by the server SERV1 for the latter to be transmitted to terminal T1 and then acquired by device 1. Device 1 then automatically unlocks the lock to free the bicycle from any riding constraint. The user can then use the bicycle 11. In order to implement this unlocking, device 1 includes a calculator for decoding, for example, a received response code $CR_1$. The decoding can be done according to a secret shared with the server and/or based on the activation code $CA_1$ Deactivation Method—Case of the Bicycle When the user wishes to leave the bicycle again after use, for example on the sidewalk, the service is deactivated so that device 1 relocks the lock or padlock of the bicycle. To this end, an action on device 1 allows a deactivation code to be generated, which may be a generated code, a distance travelled, or any other data generated by device 1 of the invention. The code includes a sequence of digits. The deactivation code thus generated can be generated with a key or secret shared with the remote server SERV1 so that the server SERV1 can automatically verify the validity of the code generated by device 1. The generated code can include data relating to the new position of the device. Thus the position can be transmitted to the server.

When the server SERV1 receives a deactivation code through terminal T1, it generates a second response code CR2 to terminal T1 via the data network NET. The second code $CR_2$ is then acquired by device 1 so that it activates the bicycle lock.

The invention can then be implemented by coupling device 1 with a dynamo in order to recover part of the kinetic energy of the bicycle to charge a battery while using the bicycle.

In the embodiment of the fire hydrant or the bicycle, the position of device 1 can be corroborated with the presumed known position of terminal T1. This action can be performed either by the terminal upon receiving the activation code CA1 or by the server SERV1 receiving the activation code from terminal T1. The position of terminal T1 can be acquired by means of GSM, LTE or other terminals providing mobile phone service. In other embodiments, the position can be deduced from the access to a WIFI network. According to another example, the position is acquired by the geolocation for example of a GPS system.

In the embodiment corresponding to a use of device 1 with a bicycle, device 1 is fastened to a bicycle for any use. The device 1 is then secured to a single bicycle. In the embodiment corresponding to a use of device 1 with a fire hydrant 10, device 1 is intended to be used with different fire hydrants. Device 1 is then fastened beforehand to be secured to a fire hydrant. The decoded position included in the activation code then determines which fire hydrant is connected by a device. It is the user identifier that can be used to find out which device 1 is being used, or according to another embodiment, each device 1 can be identified by means of a code input by the user manually or by means of a barcode or QR code and transferred to $SERV_1$.

One advantage of the invention is to provide a device 1 that is only physically connected to the object for which it controls the access to the service, fire hydrant or bicycle depending on the use.

Further, device 1 is neither connected to the electrical network nor connected to a data transmission network except for the acquisition of geographic coordinates.

Another advantage is that the activation and deactivation methods of the invention of device 1 make it possible to secure its operation. Indeed, device 1 is only turned on if the user has successfully completed a series of questions/answers that validate that such a device is manipulated by a person theoretically competent to use it. This exchange is designed to secure especially water drawing and to facilitate monitoring of the use of device 1, metering and billing by remote transmission of consumption. The activation and deactivation methods also make it possible to reduce power consumption of device 1.

The invention claimed is:

1. A method for activating a service associated with an object comprising:
   acquiring a position by means of a geolocation system of a device rigidly attached to said object;
   calculating an activation code based on the acquired position, the activation code encoding by digital compression a geographic position acquired so as to reduce the number of symbols of said acquired position;
   displaying the activation code by means of a display of the device;
   transmitting the activation code by means of an electronic mobile terminal including a wireless interface to a remote entity from a data network;
   receiving a response code by the mobile electronic terminal, said response code being generated by the remote entity;
   acquiring said response code by the device;
   decoding the response code by a calculator and a memory of the device;
   generating a command for unlocking a service associated with the object rigidly attached to said device.

2. The method according to claim 1, further comprising truncating the acquired position in order to process a second position resulting from an approximation of the position according to a predefined positioning accuracy.

3. The method according to claim 1, wherein calculating an activation code generates a unique sequence of digits, said activation code being compressed by lossless coding.

4. The method according to claim 1, further comprising transmitting a user identifier by means of an electronic mobile terminal including a wireless interface for establishing a data link with a remote entity through a data network.

5. The method according to claim 4, further comprising the following steps performed by the remote entity:
   comparing the user identifier received with a set of identifiers stored in a memory;
   validating the presence of the user identifier among the set of identifiers;
   validating the step of generating a response code.

6. The method according to claim 1, further comprising the following steps performed by the remote entity:
   decoding the activation code by a calculator and a memory of the remote entity;
   comparing the decoded position with a set of positions saved in a memory, each being associated with an object identifier;
   selecting an object identifier associated with a position located at a distance from the decoded position lower than a predefined threshold and/or verifying that the object identifier selected by means of a terminal interface is associated with a position located at a distance from the decoded position lower than a predefined threshold;
   generating a response code from the object identifier and/or from the activation code.

7. The method according to claim 1, further comprising: fastening a device to said object.

8. The method according to claim 1, comprising a plurality of position acquisition operations at regular intervals during a period in which service activation is performed.

9. The method according to claim 1, wherein the activation code includes a number of symbols equal to 7.

10. The method according to claim 1, wherein acquiring at least one response code by the device is carried out by means of an input interface of the device.

11. The method according to claim 10, wherein at least one microturbine is arranged to recover part of the energy from the flow of a water flow rate from the fire hydrant.

12. The method according to claim 1, wherein the object is a fire hydrant and wherein the device comprises an access valve, a screen and an input interface.

13. The method according to claim 12, wherein the unlocking command activates reading a water meter for measuring a delivered flow rate.

14. The method according to claim 12, wherein the unlocking command activates a first solenoid valve to initiate its opening or closing.

15. The method according to claim 1, wherein the object is a bicycle and wherein the device comprises a lock rigidly attached to the bicycle, a screen and an input interface.

16. A method for activating a service associated with an object according to claim 1, comprising:
   initiating an action for generating the deactivation code;
   displaying the deactivation code by means of a display of the device;

transmitting a deactivation code including the volume of water consumed by means of an electronic mobile terminal, said terminal including a wireless interface to be connected to a data network;

receiving a second response code by the electronic mobile terminal, said second response code being generated by the remote entity;

acquiring said second response code;

decoding the response code by a calculator and a memory of the device;

generating a command for locking a service associated with the object rigidly attached to said device deactivating the service associated with the object.

17. The method for activating a service according to claim 16, wherein:

said method comprises displaying the volume of water consumed by means of a display of the device; and/or generating the deactivation code encodes the volume of water consumed using lossless coding; and/or acquiring said second response code is carried out by means of an input interface of the device.

18. An access device to a fire hydrant comprising:

a fastener for making said access device rigidly attached to said fire hydrant;

a hydraulic unit for conveying a volume of water taken to an outlet of the device;

a water meter for measuring water consumption;

an interface for acquiring a signal delivering a position of said device, said signal being emitted from a location or geolocation system;

a calculator for generating an activation code encoded from the position of the device, said activation code encoding by digital compression the geographic position acquired so as to reduce the number of symbols of said acquired position;

a display for displaying the activation code;

at least one battery to supply power to the components of the device;

a user interface to define a response code to activate or not a service associated with the fire hydrant.

19. The access device to a fire hydrant according to claim 18, further comprising at least a first solenoid valve to activate its closing or opening according to the value of a received command.

20. An access system to a service comprising a device according to claim 18, a mobile terminal and a remote entity configured to implement a method for activating a service associated with an object.

21. An access device to a bicycle including:

a fastener for making said access device rigidly attached to a bicycle;

a lock actuated by a command of the device in order to block the riding function of the bicycle;

an interface for acquiring a signal delivering a position of said device, said signal being emitted from a location or geolocation system;

a calculator for generating an activation code encoded from the position of the device, said activation code encoding by digital compression the geographic position acquired so as to reduce the number of symbols of said acquired position;

a display for displaying the activation code;

at least one battery for supplying power to the components of said device, said battery being powered by a system that recovers the kinetic energy of the bicycle;

a user interface for defining a response code to activate or not a service associated with the bicycle.

* * * * *